United States Patent
Ionin et al.

(10) Patent No.: US 12,248,676 B2
(45) Date of Patent: Mar. 11, 2025

(54) STORAGE OPTIMIZATION OF CAT TABLE DURING BACKGROUND OPERATIONS

(71) Applicant: Western Digital Technologies, Inc., San Jose, CA (US)

(72) Inventors: Michael Ionin, Rehovot (IL); Alexander Bazarsky, Holon (IL); Itay Busnach, Raanana (IL); Noga Deshe, Raanana (IL); Judah Gamliel Hahn, Ofra (IL)

(73) Assignee: Sandisk Technologies, Inc., Milpitas, CA (US)

( * ) Notice: Subject to any disclaimer, the term of this patent is extended or adjusted under 35 U.S.C. 154(b) by 311 days.

(21) Appl. No.: 17/713,734

(22) Filed: Apr. 5, 2022

(65) Prior Publication Data

US 2023/0315285 A1    Oct. 5, 2023

(51) Int. Cl.
G06F 3/06    (2006.01)

(52) U.S. Cl.
CPC .......... G06F 3/0604 (2013.01); G06F 3/0652 (2013.01); G06F 3/0653 (2013.01); G06F 3/0656 (2013.01); G06F 3/0673 (2013.01)

(58) Field of Classification Search
None
See application file for complete search history.

(56) References Cited

U.S. PATENT DOCUMENTS

| | | | |
|---|---|---|---|
| 8,909,851 B2 | 12/2014 | Jones et al. | |
| 9,229,874 B2 * | 1/2016 | Smith | G06F 9/35 |
| 9,563,382 B2 | 2/2017 | Hahn et al. | |
| 9,569,348 B1 * | 2/2017 | Deming | G06F 12/00 |
| 9,734,066 B1 | 8/2017 | Indupuru et al. | |
| 10,528,480 B2 * | 1/2020 | Shaji Lal | G06F 12/1027 |
| 10,540,290 B2 * | 1/2020 | Loh | G06F 12/1009 |
| 10,613,778 B2 | 4/2020 | Hahn et al. | |
| 10,725,677 B2 | 7/2020 | Shechter et al. | |
| 10,795,586 B2 * | 10/2020 | Li | G06F 12/0815 |
| 10,929,285 B2 | 2/2021 | R et al. | |

(Continued)

OTHER PUBLICATIONS

Usenix Association, "Proceedings of the 19th USENIX Conference on File and Storage Technologies (FAST 21)", Retrieved from Internet URL: https://www.usenix.org/sites/default/files/fast21_full-proceedings.pdf, Retrieved on Jul. 18, 2023, 439 pages, (Feb. 23-25, 2021).

*Primary Examiner* — Elias Mamo
(74) *Attorney, Agent, or Firm* — PATTERSON + SHERIDAN, LLP (57) ABSTRACT

A data storage device includes a memory device, a random access memory (RAM) device, and a controller coupled to the memory device and the RAM device. The controller is configured to determine a workload type of the data storage device, determine to store at least a portion of a compressed logical to physical translation table (ZCAT) in the RAM device based on the workload type, and utilize a remaining portion of the RAM device to perform background operations. The controller is further configured to determine a persistence or temperature of the ZCAT, where the portion of the ZCAT stored to the RAM device is based on the persistence and/or the temperature of the ZCAT. The remaining portion of the ZCAT is stored in the HMB, where the remaining portion may update any out-of-date ZCAT entries.

20 Claims, 7 Drawing Sheets

(56) References Cited

U.S. PATENT DOCUMENTS

| | | |
|---|---|---|
| 11,662,953 B2 * | 5/2023 | Sato .................... G06F 3/0661 |
| | | 711/154 |
| 2015/0149817 A1 | 5/2015 | Strasser et al. |
| 2017/0351452 A1 | 12/2017 | Boyd et al. |
| 2018/0046231 A1 | 2/2018 | Raghu et al. |
| 2020/0226080 A1 * | 7/2020 | Tarango ............. G06F 13/1668 |
| 2021/0294751 A1 | 9/2021 | Boals et al. |
| 2022/0083280 A1 * | 3/2022 | Su ........................ G06F 12/10 |
| 2022/0171713 A1 * | 6/2022 | Malshe .............. G06F 12/0246 |

\* cited by examiner

STORAGE OPTIMIZATION OF CAT TABLE DURING BACKGROUND OPERATIONS

BACKGROUND OF THE DISCLOSURE

Field of the Disclosure

Embodiments of the present disclosure generally relate to data storage devices, such as solid state drives (SSDs), and, more specifically, operation of the data storage device during background operations.

Description of the Related Art

A computer assisted translation (CAT) table may be a logical to physical address translation table, such as an L2P table, where logical block addresses (LBAs) used by a host device are translated to physical block addresses (PBAs) of a data storage device. For simplification purposes, a logical to physical address translation table may be referred to as a CAT table herein. The CAT table may be a large table that is stored in the flash memory, such as a non-volatile memory, of the data storage device and is partially loaded to random access memory (RAM) of the data storage device in order to reduce read latency. When a dynamic random access memory (DRAM) of the host device includes a host memory buffer, an area of storage for use by a controller of the data storage device, the controller may partially or entirely store the CAT table in the host memory buffer (HMB). The HMB may have a faster access time than the flash memory.

However, there is an associated overhead with moving the CAT table to the HMB. For example, the associated overhead may include using the HMB resources and managing a delta CAT table, where the delta CAT table tracks the difference between the CAT table stored in the flash memory and the CAT table stored in the HMB. Because the CAT table in the HMB is periodically updated, the CAT table in the HMB may be storing outdated information when compared to the CAT table of the flash memory, where the CAT table of the flash memory is generally up-to-date. Because the HMB may not be storing the most up-to-date version of the CAT table and the CAT table may require a large amount of storage space, storing the CAT table in the HMB may be inefficient during data storage device operation.

Therefore, there is a need in the art for an improved and optimized storage of the CAT table in the HMB during data storage device operation.

SUMMARY OF THE DISCLOSURE

The present disclosure generally relates to data storage devices, such as solid state drives (SSDs), and, more specifically, operation of the data storage device during background operations. A data storage device includes a memory device, a random access memory (RAM) device, and a controller coupled to the memory device and the RAM device. The controller is configured to determine a workload type of the data storage device, determine to store at least a portion of a compressed logical to physical translation table (ZCAT) in the RAM device based on the workload type, and utilize a remaining portion of the RAM device to perform background operations. The controller is further configured to determine a persistence or temperature of the ZCAT, where the portion of the ZCAT stored to the RAM device is based on the persistence and/or the temperature of the ZCAT. The remaining portion of the ZCAT is stored in the HMB, where the remaining portion may update any out-of-date ZCAT entries.

In one embodiment, a data storage device includes a memory device, a random access memory (RAM) device, and a controller coupled to the memory device and the RAM device. The controller is configured to determine a workload type of the data storage device, determine to store at least a portion of a compressed logical to physical translation table (ZCAT) in the RAM device based on the workload type, and utilize a remaining portion of the RAM device to perform background operations.

In another embodiment, a data storage device includes a memory device and a controller coupled to the memory device. The controller is configured to determine that the data storage device is in a low power mode, check a workload locality and a current placement of a logical to physical table (CAT), determine that the CAT is unfit for the workload locality, and modify contents of the CAT based on the workload locality.

In another embodiment, a data storage device includes memory means and a controller coupled to the memory means. The controller is configured to estimate a score based on a compressed logical to physical table (ZCAT) persistence during background operations and a bandwidth needed for the background operations, determine to erase the ZCAT or move the ZCAT based on the score, and move the ZCAT to a host memory buffer (HMB) for a duration of the background operations.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, operation of the data storage device during background operations. A data storage device includes a memory device, a random access memory (RAM) device, and a controller coupled to the memory device and the RAM device. The controller is configured to determine a workload type of the data storage device, determine to store at least a portion of a compressed logical to physical translation table (ZCAT) in the RAM device based on the workload type, and utilize a remaining portion of the RAM device to perform background operations. The controller is further configured to determine a persistence or temperature of the ZCAT, where the portion of the ZCAT stored to the RAM device is based on the persistence and/or the temperature of the ZCAT. The remaining portion of the ZCAT is stored in the HMB, where the remaining portion may update any out-of-date ZCAT entries.

Figure 1:
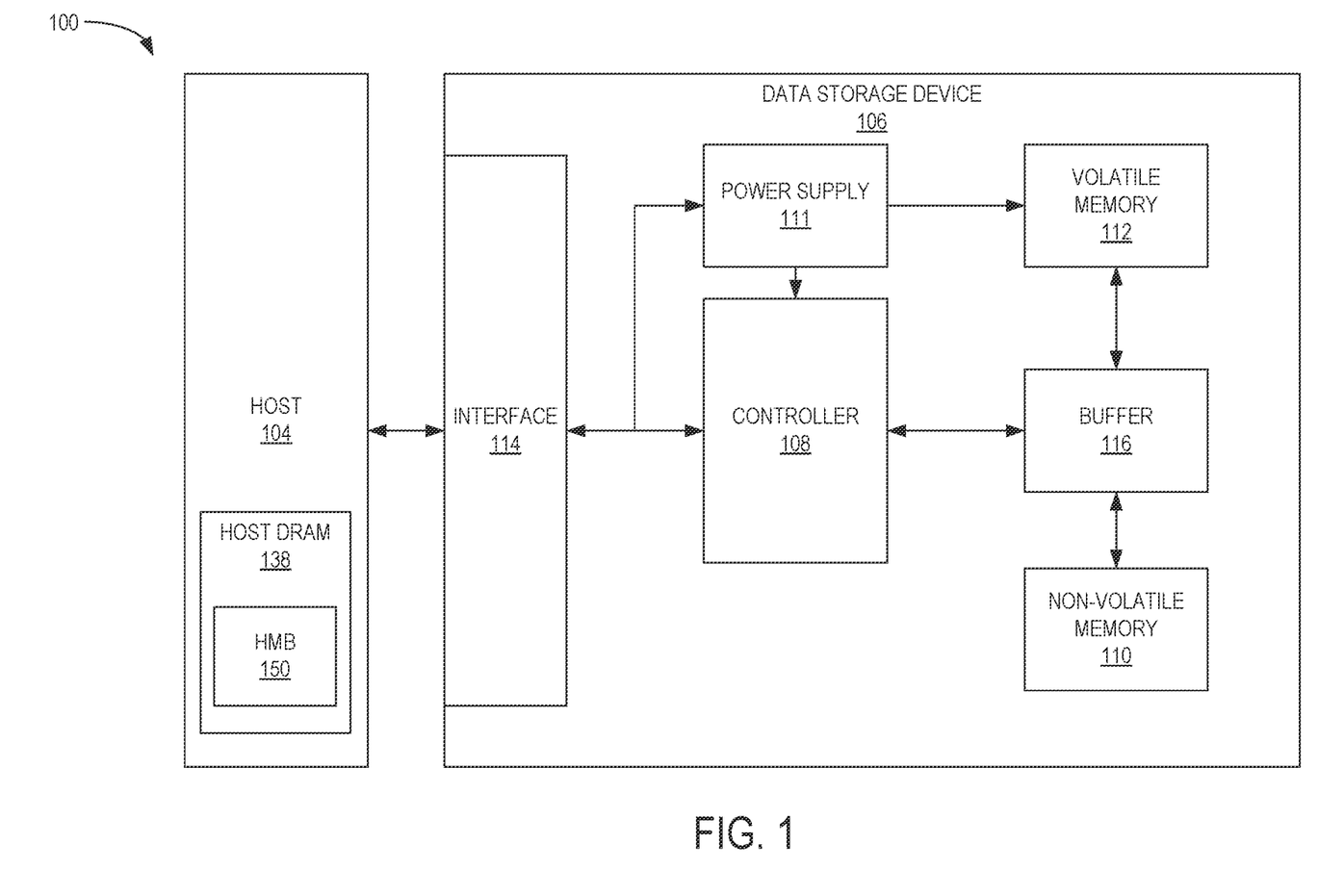
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. The host DRAM 138 includes a host memory buffer (HMB) 150. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Furthermore, the controller 108 may store data and retrieve data from the HMB 150. The HMB 150 is a portion of the host DRAM 138 that is apportioned for use by the controller 108 without host device 104 interaction. For example, the HMB 150 may be used to store data normally stored in an internal RAM, such as SRAM or DRAM. In other examples, the controller 108 may store data in the HMB 150 during a shutdown operation such that the data may not be lost due to flushing of the volatile memory 112. Furthermore, latency of accessing and retrieving data from the HMB 150 may be quicker than accessing and retrieving data of the NVM 110, such that the controller 108 may program data to the HMB 150 during the operation of the data storage device 106 and commit the data that is programmed to the HMB 150 to the NVM 110 at certain points during the operation of the data storage device 106.

In NVMe protocol, the HMB 150 may be accessed by the controller 108 when the data storage device 106 is in a low power mode. For example, if the controller 108 indicates support for the Host Memory Non-operational Access Restricted (HMNAR) in the Controller Attributes (CTRATT) field in the Identify Controller data structure and the HMNAR bit is set to '1' (disabled), then the controller 108 may access the HMB 150 while processing a command submitted to the Admin Submission Queue. However, when the Host Memory Non-operational Access Restricted is enabled, the controller 108 may not access the HMB 150 in order to perform controller-initiated activity, such as an activity not directly associated with a host command. It is to be understood that the previously listed example is not intended to be limiting, but to provide an example of a possible embodiment. It is to be understood that the Host Memory Non-operational Access Restricted (HMNAR) may be referred to as HMB Prohibit Non-Operational Access (NAP) in some examples. Furthermore, it is contemplated that the disclosed embodiments may be applicable to any HMB access commands/bits.

Figure 2:
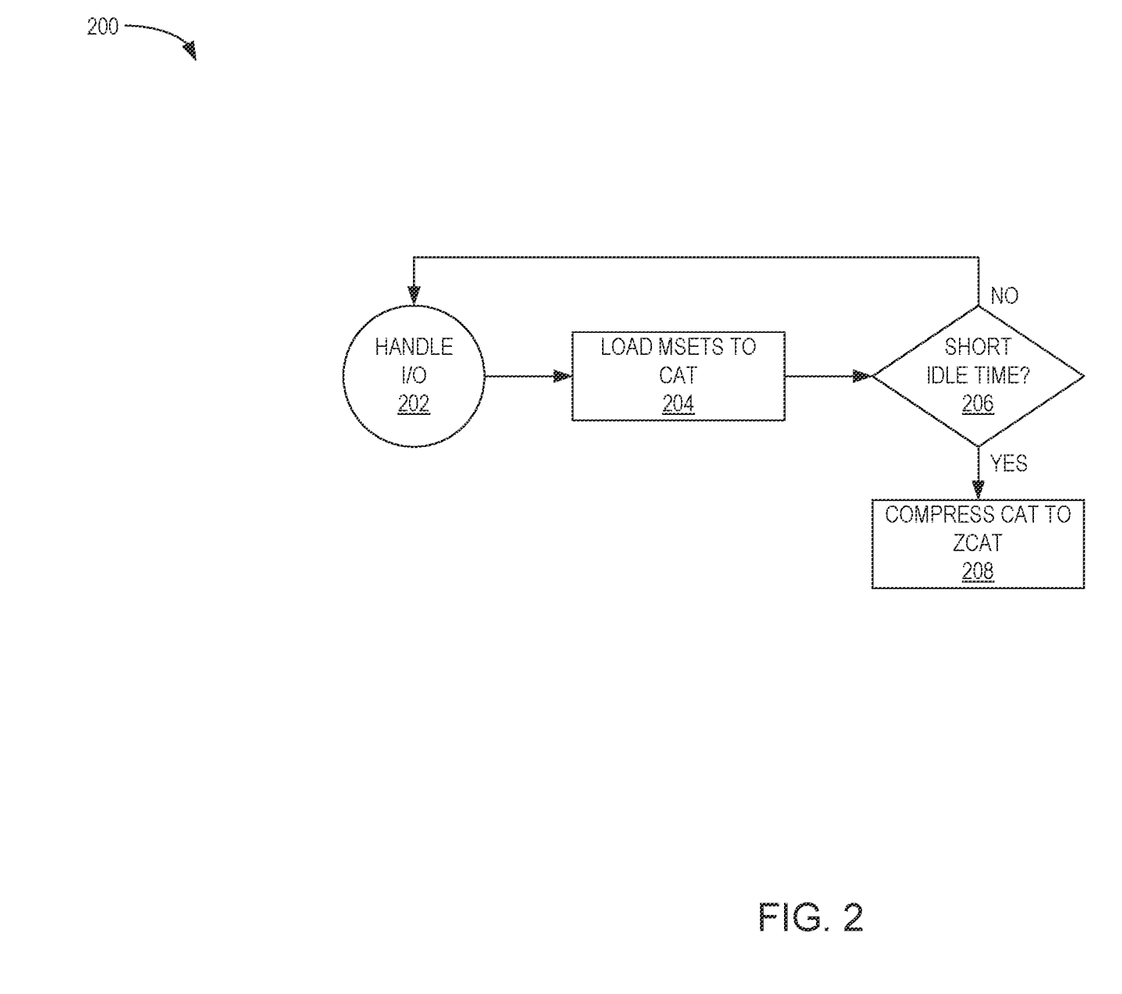
FIG. 2 is a flow diagram illustrating a method of compressing a CAT table (ZCAT), according to certain embodiments.

FIG. 2 is a flow diagram illustrating a method 200 of compressing a CAT table (ZCAT), according to certain embodiments. Method 200 may be implemented by a controller, such as the controller 108 of FIG. 1. For exemplary purposes, aspects of the storage system 100 of FIG. 1 may be referenced herein. At block 202, the controller 108 is handling input/output (I/O) operations. At block 204, the controller 108 loads mSets to a computer assisted translation (CAT) table may be a logical to physical address translation table, such as an L2P table, where logical block addresses (LBAs) used by a host device are translated to physical block addresses (PBAs) of a data storage device. For simplification purposes, a logical to physical address translation table may be referred to as a CAT table herein. An mSet is a basic flash page, having a size in the order of about 32 KB) that includes many mSet entries associated with the CAT table. Each mSet entry may be in a size in the order of about 4 KB. The previously listed sizes are not intended to be limiting, but to provide an example of a possible embodiment.

At block 206, the controller 108 determines if there is a short idle time period. For example, the short idle time period may be a period of time that the controller 108 is not busy with other commands or transactions or if a number of I/O operations decreases below a threshold value. If there is a short idle time period at block 206, then the controller 108 compresses the CAT table to a compressed CAT table (ZCAT) at block 208. However, if there is not a short idle time period at block 206, then method 200 returns to block 202.

Figure 3:
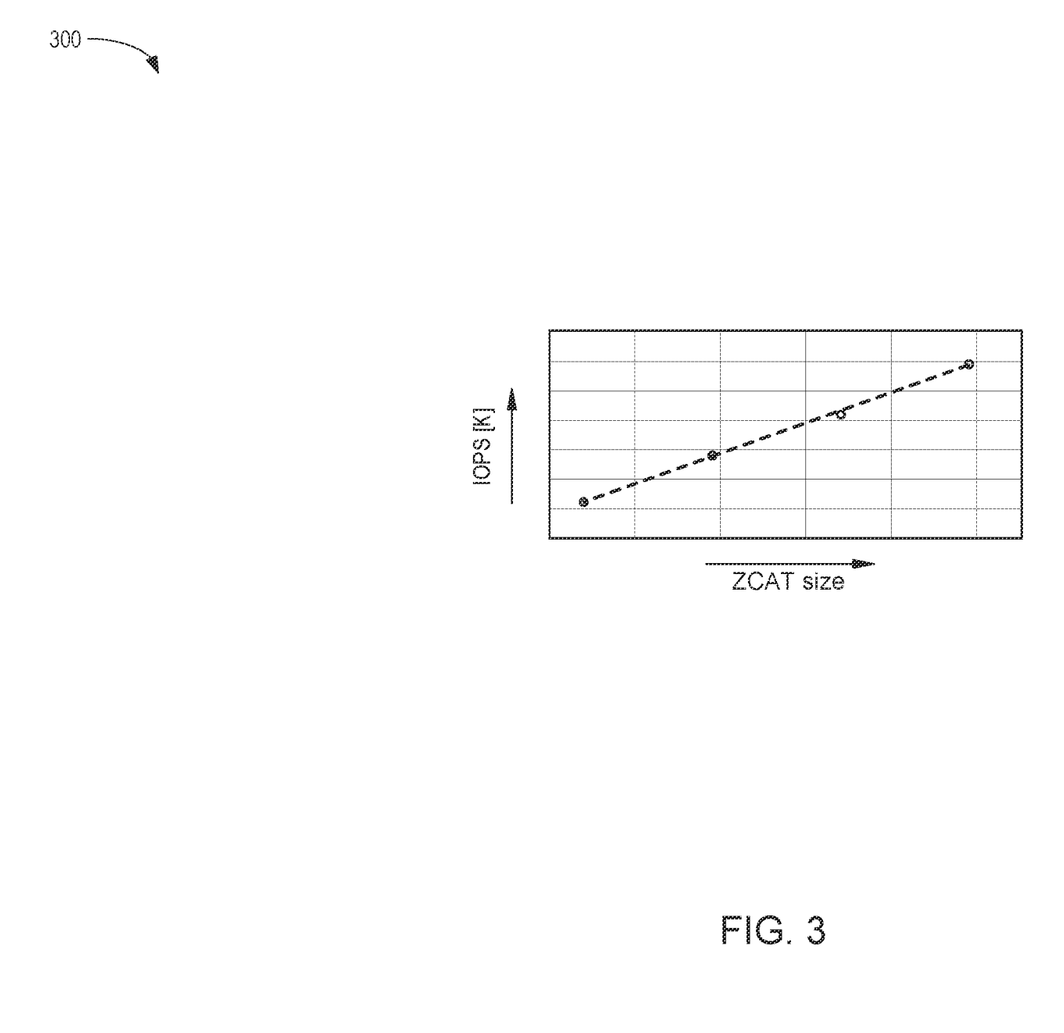
FIG. 3 is a graph illustrating random read input/output (IO) operations per second (IOPS) vs ZCAT size, according to certain embodiments.

FIG. 3 is a graph 300 illustrating random read input/output (I/O) operations per second (IOPS) vs ZCAT size, according to certain embodiments. For exemplary purposes, aspects of the storage system 100 of FIG. 1 may be referenced herein. When the data storage device 106 enters a background operations (BKOPs) mode, the controller 108 may release the ZCAT stored in volatile memory, such as SRAM of the controller 108, in order to accelerate BKOPs, such as relocating data from SLC memory to TLC memory, relocating data from TLC memory to TLC memory, periodic read threshold calibration, and the like. Because the ZCAT may be released when a data storage device 106 enters the BKOPs mode, the ZCAT may not be available for the data storage device 106 after exiting the BKOPs mode.

Thus, for scenarios of random reads after exiting BKOPs mode, the performance of the data storage device 106 may be decreased or impacted as the controller 108 is handling the random reads and does not have idle time to rebuild the ZCAT. As shown in graph 300, as the size of the ZCAT increases, the number of IOPS increases, thus, improving random read performance. Therefore, by keeping the ZCAT as large as possible and available to the controller 108, the performance of the data storage device 106 when perform random reads may be improved.

Figure 4A:
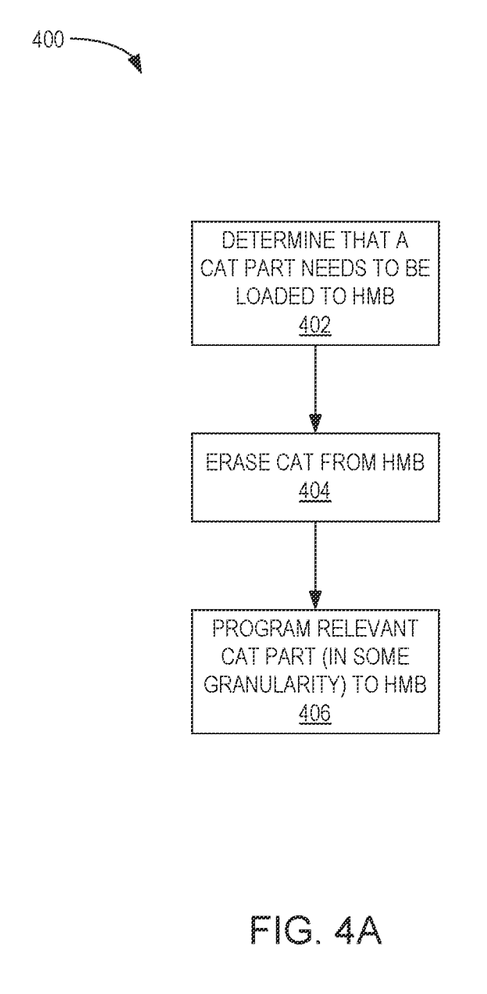
FIG. 4A is a flow diagram illustrating a method of writing a CAT table to a memory device, according to certain embodiments.

FIG. 4A is a flow diagram illustrating a method 400 of writing a CAT table to a memory device, according to certain embodiments. Method 400 may be implemented by a controller, such as the controller 108 of FIG. 1. For exemplary purposes, aspects of the storage system 100 of FIG. 1 may be referenced herein. At block 402, the controller 108 determines that a CAT table part is needed, but not located in the HMB 150. At block 404, the controller 108 erases the CAT table part from the HMB 150. At block 406, the controller 108 programs the relevant CAT table part, at some granularity, to the HMB.

Figure 4B:
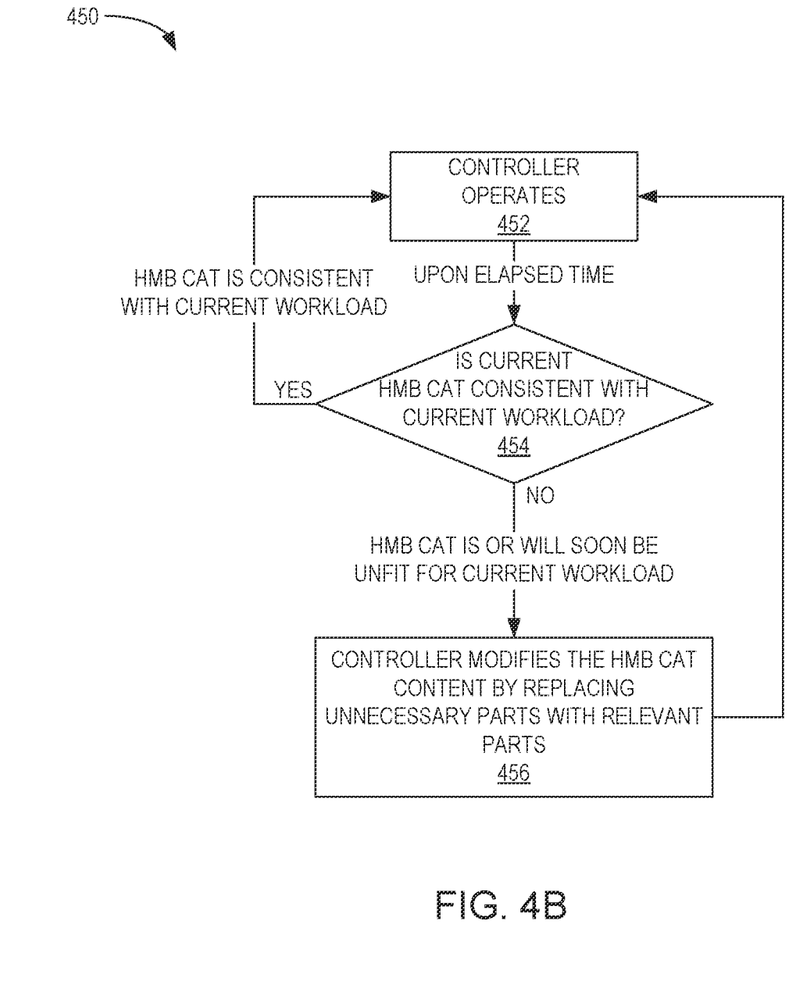
FIG. 4B is a flow diagram illustrating a method of writing a CAT table to a memory device, according to certain embodiments.

FIG. 4B is a flow diagram illustrating a method 450 of writing a CAT table to a memory device, according to certain embodiments. Method 450 may be implemented by a controller, such as the controller 108 of FIG. 1. For exemplary purposes, aspects of the storage system 100 of FIG. 1 may be referenced herein. Method 450 may utilize estimating the best utilization of SRAM space, where the results of the estimation may lead to improvements in random read performance when keeping the ZCAT in the controller 108 or faster BKOPs when the SRAM space is dedicated to BKOPs. Furthermore, method 450 may utilize analyzing the current workload in order to choose which parts of the CAT table to remain in the HMB 150 and which parts of the CAT table to evict from the HMB 150. It is to be understood that the described embodiments herein may be applicable to other RAM structures other than SRAM, such as DRAM.

At block 452, the controller 108 operates. The operation of the controller 108 may be receiving, processing, and executing I/O commands. At block 454, the controller 108 determines if the current HMB CAT table is consistent with the current workload. For example, current workload may be a random read workload, a random write workload, a random read and write workload, a sequential read workload, a sequential write workload, a sequential read and write workload, or a combination of a random read/write workload and a sequential read/write workload. If the CAT table stored in the HMB 150 is consistent with the current workload at block 454, the method 450 returns to block 452. However, if the CAT table stored in the HMB 150 is not consistent with the current workload at block 454, then the controller 108 modifies the CAT table stored in the HMB 150 by replacing unnecessary parts or entries with relevant parts or entries. It is to be understood that "is not consistent" may refer to "soon to be unfit or not consistent". Furthermore, the modifying at block 456 may occur when the data storage device 106 is in a low power mode and when the HMNAR is disabled.

Figure 5:
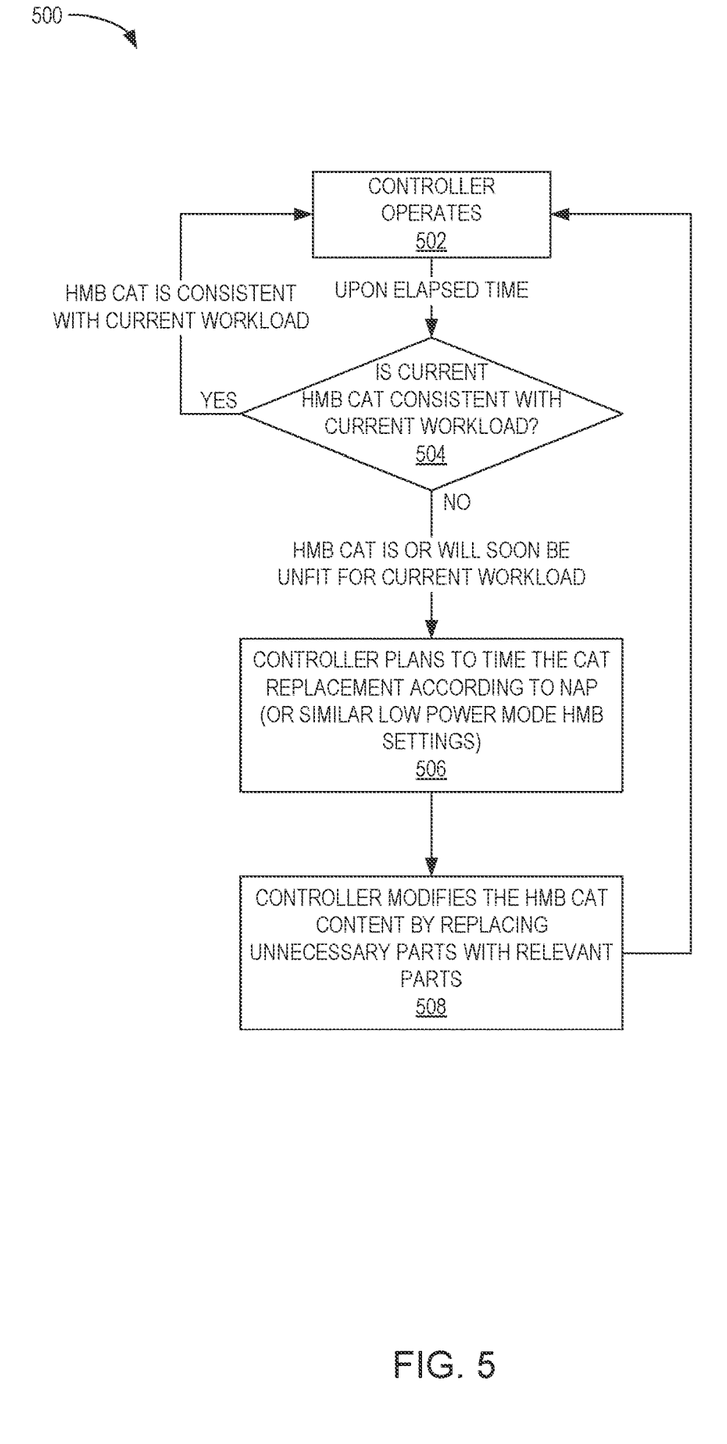
FIG. 5 is a flow diagram illustrating a method of modifying a CAT table during a low power mode, according to certain embodiments.

FIG. 5 is a flow diagram illustrating a method 500 of modifying a CAT table during a low power mode, according to certain embodiments. Method 500 may be implemented by a controller, such as the controller 108 of FIG. 1, where the HMNAR feature (or similar features) is present in order to allow the controller 108 access a HMB of a host device during a low power mode. For exemplary purposes, aspects of the storage system 100 of FIG. 1 may be referenced herein.

At block 502, the controller 108 operates. The operation of the controller 108 may be receiving, processing, and executing I/O commands. After an elapsed period of time, the controller 108 determines if the current CAT table stored in the HMB 150 is consistent with the current workload at block 504. The elapsed period of time may be a threshold period of time between checking if the current CAT table stored in the HMB 150 is consistent with the current workload. The threshold period of time may be configurable by the controller 108 or predetermined. If the current CAT table stored in the HMB 150 is consistent with the current workload at block 504, then method 500 returns to block 502. It is to be understood that the described embodiments herein may be applicable to other RAM structures other than SRAM, such as DRAM.

However, if the current CAT table stored in the HMB 150 is consistent with the current workload at block 504, then the controller 108 plans to time the CAT table replacement according to HMNAR (or similar low power mode HMB settings) at block 506. It is to be understood that "is not consistent" may refer to "soon to be unfit or not consistent". At block 508, the controller 108 modifies the CAT table stored in the HMB 150 by replacing unnecessary parts or entries with relevant parts or entries. The controller 108 may utilize method 500 prior to initiating BKOPs. For example, the HMB 150 may be used as a temporary storage location for the ZCAT (or CAT table) prior to starting BKOPs. After the BKOPs are completed, the ZCAT (or CAT table) is copied back to the SRAM of the controller 108, or another relevant storage location for the ZCAT (or CAT table). Thus, by storing the ZCAT (or CAT table) in the HMB 150, the ZCAT (or CAT table) may be moved to the SRAM of the controller 108 when the data storage device 106 exits the BKOPs mode. It is contemplated that the ZCAT or CAT table may be stored in a different location besides the SRAM of the controller 108.

Figure 6A:
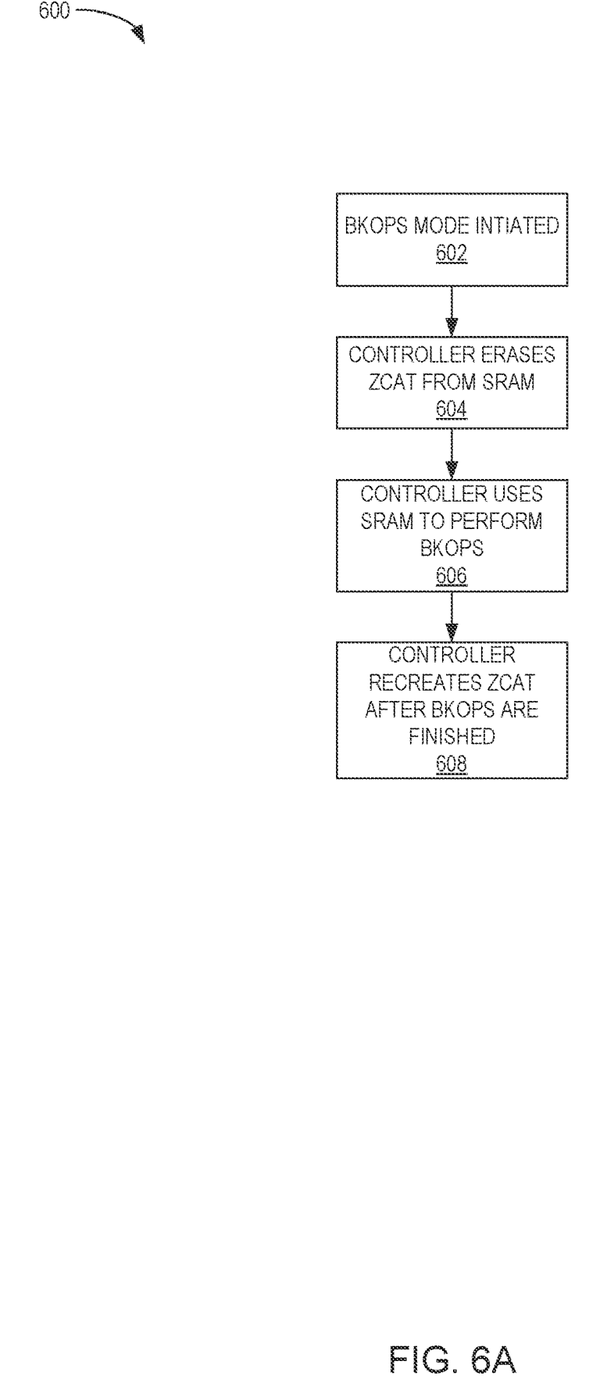
FIG. 6A is a flow diagram illustrating a method of an operation of a controller during background operations, according to certain embodiments.

FIG. 6A is a flow diagram illustrating a method 600 of an operation of a controller, such as the controller 108, during background operations, according to certain embodiments. Method 600 may be implemented by a controller, such as the controller 108 of FIG. 1. For exemplary purposes, aspects of the storage system 100 of FIG. 1 may be referenced herein. At block 602, a BKOPs mode is initiated for the data storage device 106. At block 604, the controller 108 erases the ZCAT from the SRAM of the controller 108. At block 606, the controller 108 uses the SRAM to perform BKOPs. At block 608, the controller 108 recreates the ZCAT after the BKOPs is completed.

Figure 6B:
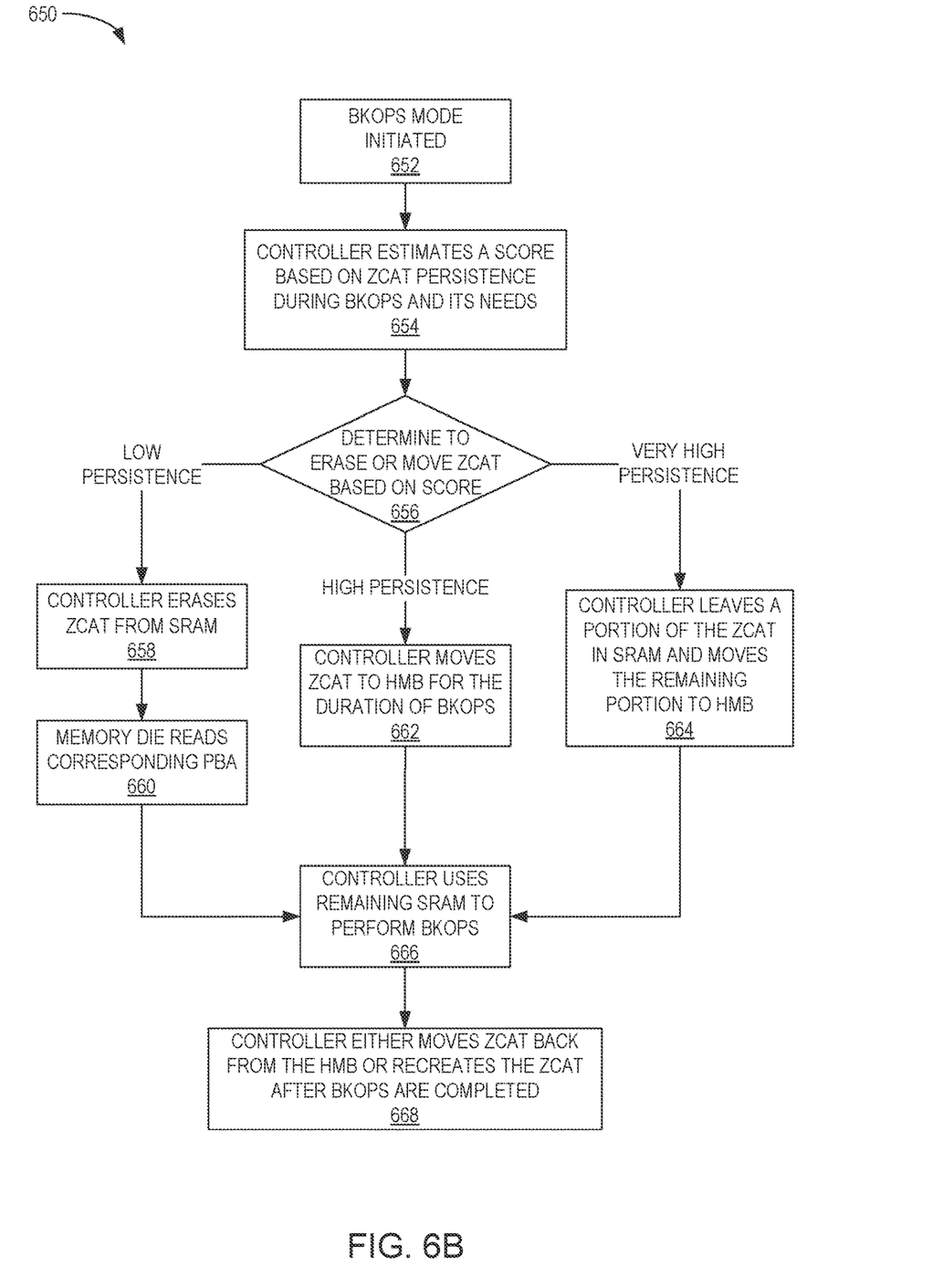
FIG. 6B is a flow diagram illustrating a method of an operation of a controller during background operations, according to certain embodiments.

FIG. 6B is a flow diagram illustrating a method 650 of an operation of a controller, such as the controller 108, during background operations, according to certain embodiments. Method 650 may be implemented by a controller, such as the controller 108 of FIG. 1. For exemplary purposes, aspects of the storage system 100 of FIG. 1 may be referenced herein. Prior to BKOPs beginning, the controller 108 may determine if there is a need to keep the ZCAT in the SRAM of the controller 108 or copy at least a portion of the ZCAT to the HMB 150. When BKOPs are expected to be short and have little to no influence on the ZCAT, there may be an advantage in storing the ZCAT or at least a larger portion of the ZCAT in SRAM rather than the HMB 150. Thus, the ZCAT stored in the SRAM of the controller 108 may be available for the controller 108 after the BKOPs are over and random read operations are resumed. It is to be understood that the described embodiments herein may be applicable to other RAM structures other than SRAM, such as DRAM.

At block 652, the data storage device 106 enters a BKOPs mode. At block 654, the controller estimates a score based on ZCAT persistence during BKOPs and its needs (i.e., the bandwidth and resources needed for completing the BKOPs) (e.g., speed of performing BKOPs). For example, the score may be related to temperature, such that a score that is "cold" refers to potentially not needing the data in the ZCAT soon and a score that is "hot" refers to potentially needing the data in the ZCAT soon. We may infer the BKOPs impact on the ZCAT by identifying the different BKOPs properties. For example, the physical range of expected BKOPs operations may be inferred if there is SLC data that is going to be folded to TLC/QLC. Likewise, some hybrid blocks may also be relocated during BKOPs. Data that is marked with a high bit error rate may be the target of a read scrub operation. Therefore, the addresses of the SLC data, the hybrid blocks, the data that is marked with a high bit error rate may be taken into account when estimating the score based on the ZCAT persistence during BKOPs.

The BKOPs phase prediction may be performed with any prediction scheme, such as machine learning, deep learning, and the like. Furthermore, the controller 108 may receive an indication from the host device 104 indicating a memory range that may be read in the future. When the controller 108 receives the indication, the controller 108 may read the data in advance (e.g., read look ahead) in order to prepare for the next memory range read. Thus, the controller 108 may determine and/or ensure that the correct CAT table entries corresponding to the next memory range read are in an accessible location for the read after BKOPs, such as in SRAM of the controller 108 or the HMB 150.

At block 656, the controller 108 determines to erase or move the ZCAT from the SRAM based on the score. If the score corresponds to a cold temperature or a low persistence at block 656, then the controller 108 erases the ZCAT from the SRAM of the controller 108 at block 658. At block 660, the memory die reads data from the corresponding physical block address (PBA). However, if the score corresponds to a warm temperature or a high persistence at block 656, then the controller 108 moves the ZCAT to the HMB 150 for the duration of the BKOPs. The controller 108 may determine that the information stored in the ZCAT may be need in the future, but not needed immediately after the BKOPs are completed. If the score corresponds to a hot temperature or a very high persistence at block 656, then the controller 108 leaves a portion of the ZCAT in the SRAM of the controller 108 and moves the remaining portion to the HMB 150. The portion of the ZCAT that remains in the SRAM of the controller 108 may be one or more ZCAT entries pertaining to data stored in the NVM 110 that may be used soon. For example, the one or more ZCAT entries may correspond SLC data being folded to TLC/QLC memory, hybrid blocks that are being relocated, data that is marked with a high bit error rate indication, and the like.

At block 666, the controller 108 uses the remaining SRAM to perform the BKOPs. At block 668, the controller either moves the ZCAT back from the HMB when at least a portion of the ZCAT was moved to the HMB prior to the BKOPs mode or recreates the ZCAT when the ZCAT was erased from the SRAM due to a cold temperature or low persistence of the ZCAT after the BKOPs are completed.

By determining a persistence of the ZCAT or the CAT table prior to entering a background operations mode and moving up to all of the ZCAT or the CAT table based on the persistence of the ZCAT or the CAT table to a host memory buffer, random read performance after exiting the background operations mode may be improved.

In one embodiment, a data storage device includes a memory device, a random access memory (RAM) device, and a controller coupled to the memory device and the RAM device. The controller is configured to determine a workload type of the data storage device, determine to store at least a portion of a compressed logical to physical translation table (ZCAT) in the RAM device based on the workload type, and utilize a remaining portion of the RAM device to perform background operations.

The controller is further configured to determine a temperature of the ZCAT. The controller is further configured to determine a speed of performing background operations based on the temperature of the ZCAT. The controller is further configured to erase the ZCAT from the RAM device upon determining that the temperature of the ZCAT is cold. The controller is further configured to determine that all of the ZCAT is to be stored in a host memory buffer (HMB) after utilizing the RAM device to store at least the portion of the ZCAT. The controller is further configured to move the ZCAT to a host memory buffer (HMB) for a duration of the background operations when the temperature of the ZCAT is warm. The controller is further configured to move a remaining portion of the ZCAT to a host memory buffer (HMB) when the temperature of the ZCAT is hot. The speed of performing background operations is affected by a relocation speed of one or more blocks from a source block to a destination block. The speed of performing background operations is affected by a bit error rate (BER) of one or more blocks associated with the background operations. The ZCAT is restored in the RAM device after the background operations have been performed.

In another embodiment, a data storage device includes a memory device and a controller coupled to the memory device. The controller is configured to determine that the data storage device is in a low power mode, check a workload locality and a current placement of a logical to physical table (CAT), determine that the CAT is unfit for the workload locality, and modify contents of the CAT based on the workload locality.

The modifying includes replacing unnecessary logical to physical (L2P) entries in the CAT with relevant L2P entries. The modifying is modifying the CAT that is stored in the HMB. The modifying occurs when a Host Memory Non-operational Access Restricted (HMNAR) bit is set to 1. At least a portion of the CAT is stored in a host memory buffer (HMB). A remaining portion of the CAT that is not stored in the HMB is associated with an indication of a memory range that is soon to be read. The portion of the CAT that is stored in the HMB is copied back to the data storage device when background operations of the data storage device is completed or when the data storage device exits the low power mode.

In another embodiment, a data storage device includes memory means and a controller coupled to the memory means. The controller is configured to estimate a score based on a compressed logical to physical table (ZCAT) persistence during background operations and a bandwidth needed for the background operations, determine to erase the ZCAT or move the ZCAT based on the score, and move the ZCAT to a host memory buffer (HMB) for a duration of the background operations.

The controller is further configured to use a remaining portion of a random access memory (RAM) to perform the background operations. The controller is further configured to either move the ZCAT from the HMB to the RAM or recreate the ZCAT in the RAM after the background operations are completed.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device
   a random access memory (RAM) device; and
   a controller coupled to the memory device and the RAM device, wherein the controller is configured to:
   determine a workload type of the data storage device;
   determine whether the workload type of the data storage device is consistent with a workload type of the RAM device;
   determine to store at least a portion of a compressed logical to physical translation table (ZCAT) in the RAM device if the workload type of the RAM device is inconsistent with the workload type of the data storage device; and
   utilize a remaining portion of the RAM device to perform background operations.

2. The data storage device of claim 1, wherein the controller is further configured to determine a temperature of the ZCAT.

3. The data storage device of claim 2, wherein the controller is further configured to determine a speed of performing background operations based on the temperature of the ZCAT.

4. The data storage device of claim 3, wherein the controller is further configured to erase the ZCAT from the RAM device upon determining that the temperature of the ZCAT is cold.

5. A data storage device, comprising:
   a memory device
   a random access memory (RAM) device; and
   a controller coupled to the memory device and the RAM device, wherein the controller is configured to:
   determine a workload type of the data storage device;
   determine to store at least a portion of a compressed logical to physical translation table (ZCAT) in the RAM device based on the workload type;
   utilize a remaining portion of the RAM device to perform background operations;
   determine a temperature of the ZCAT;
   determine a speed of performing background operations based on the temperature of the ZCAT; and
   determine that all of the ZCAT is to be stored in a host memory buffer (HMB) after utilizing the RAM device to store at least the portion of the ZCAT.

6. The data storage device of claim 5, wherein the controller is further configured to move the ZCAT to a host memory buffer (HMB) for a duration of the background operations when the temperature of the ZCAT is warm.

7. The data storage device of claim 3, wherein the controller is further configured to move a remaining portion of the ZCAT to a host memory buffer (HMB) when the temperature of the ZCAT is hot.

8. A data storage device, comprising:
   a memory device
   a random access memory (RAM) device; and
   a controller coupled to the memory device and the RAM device, wherein the controller is configured to:
   determine a workload type of the data storage device;
   determine to store at least a portion of a compressed logical to physical translation table (ZCAT) in the RAM device based on the workload type;
   utilize a remaining portion of the RAM device to perform background operations;
   determine a temperature of the ZCAT; and
   determine a speed of performing background operations based on the temperature of the ZCAT, wherein the speed of performing background operations is affected by a relocation speed of one or more blocks from a source block to a destination block.

9. A data storage device, comprising:
   a memory device
   a random access memory (RAM) device; and
   a controller coupled to the memory device and the RAM device, wherein the controller is configured to:
   determine a workload type of the data storage device;
   determine to store at least a portion of a compressed logical to physical translation table (ZCAT) in the RAM device based on the workload type;
   utilize a remaining portion of the RAM device to perform background operations;
   determine a temperature of the ZCAT; and
   determine a speed of performing background operations based on the temperature of the ZCAT, wherein the speed of performing background operations is affected by a bit error rate (BER) of one or more blocks associated with the background operations.

10. The data storage device of claim 1, wherein the ZCAT is restored in the RAM device after the background operations have been performed.

11. The data storage device of claim 1, wherein the workload type of the RAM device is further inconsistent with the workload type of the data storage device when the workload type of the RAM device is soon to be unfit.

12. The data storage device of claim 1, wherein the controller is further configured to:
   determine that the data storage device is in a low power mode;
   check a workload locality and a current placement of a logical to physical table (CAT);
   determine that the CAT is unfit for the workload locality; and
   modify contents of the CAT based on the workload locality.

13. The data storage device of claim 12, wherein modifying comprises replacing unnecessary logical to physical (L2P) entries in the CAT with relevant L2P entries.

14. The data storage device of claim 12, wherein the modifying is modifying the CAT that is stored in a host memory buffer (HMB).

15. The data storage device of claim 12, wherein the modifying occurs when a Host Memory Non-operational Access Restricted (HMNAR) bit is set to 1.

16. The data storage device of claim 12, wherein at least a portion of the CAT is stored in a host memory buffer (HMB).

17. The data storage device of claim 16, wherein a remaining portion of the CAT that is not stored in the HMB is associated with an indication of a memory range that is soon to be read.

18. The data storage device of claim 16, wherein the portion of the CAT that is stored in the HMB is copied back to the data storage device when background operations of the data storage device is completed or when the data storage device exits the low power mode.

19. The data storage device of claim 1, wherein the controller is further configured to:
- estimate a score based on a compressed logical to physical table (ZCAT) persistence during background operations and a bandwidth needed for the background operations;
- determine to erase the ZCAT or move the ZCAT based on the score; and
- move the ZCAT to a host memory buffer (HMB) for a duration of the background operations.

20. The data storage device of claim 19, wherein the controller is further configured to:
- use a remaining portion of a random access memory (RAM) to perform the background operations; and
- either move the ZCAT from the HMB to the RAM or recreate the ZCAT in the RAM after the background operations are completed.

* * * * *